Feb. 1, 1966  M. R. ESTABROOK  3,232,008
AUTOMATIC HONING MACHINE
Filed March 4, 1965  9 Sheets-Sheet 3

INVENTOR
Mark R. Estabrook
by Wolfe, Hubbard, Voit & Osann
ATTORNEY

Fig. 14C

United States Patent Office 3,232,008
Patented Feb. 1, 1966

3,232,008
AUTOMATIC HONING MACHINE
Mark R. Estabrook, Rockford, Ill., assignor to Barnes
Drill Co., Rockford, Ill., a corporation of Illinois
Filed Mar. 4, 1965, Ser. No. 440,672
17 Claims. (Cl. 51—34)

This is a continuation-in-part of my copending application Serial No. 280,849.

This invention relates to automatic machines for honing work bores by reciprocating a radially expansible and contractible honing tool back and forth within the bore while rotating the tool and slowly expanding the same within the bore to maintain relatively high honing pressure between the bore wall and the abrasive elements on the tool until the bore is enlarged to the desired size. The invention has more particular reference to honing machines capable of performing a supplemental or finishing cycle to polish the bore wall after the latter has been rough honed to the desired size. Usually, such supplemental honing is performed under reduced pressure as compared to the pressure used during rough honing.

The primary object of the present invention is to improve the finish obtained by supplemental honing while reducing the finishing time required.

A more detailed object is to produce an improved finishing cycle by varying the rate of reciprocation as well as by the honing pressure used, and also by varying the rate of rotation.

Another object is to provide novel and relatively simple mechanism for expanding the hone rapidly to bring the abrasive elements close to the bore wall preparatory to rough honing while preventing excessive starting pressure between the hone and the bore wall.

Other objects and advantages of the present invention will become apparent from the following detailed description taken in connection with the accompanying drawings, in which.

THE HONING MACHINE

Figures 5, 6:
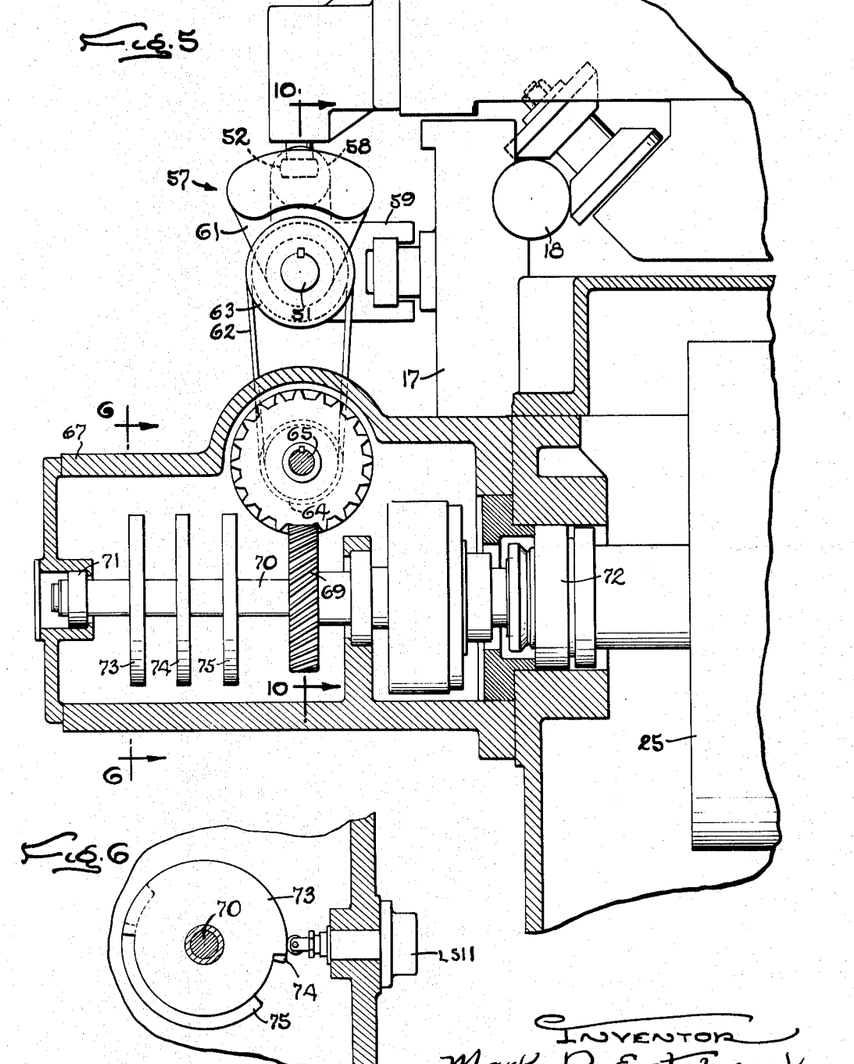
FIG. 5 is an enlarged fragmentary section taken along the line 5—5 of FIG. 1.
FIG. 6 is a fragmentary sectional view taken along the line 6—6 of FIG. 5.

As shown in the drawings for the purposes of illustration, the invention is embodied in a horizontal honing machine in which a radially expansible and contractible honing tool 10 is carried by the outer end of a hollow spindle 11 journaled in a tool head 12 and projecting horizontally from the head along the axis of the bore 13 of a workpiece 14 to be honed. The workpiece is clamped in a fixture 15 on the machine base 17 and the tool head is guided on the base for reciprocation along guide rods 18 (FIG. 5) toward and away from the workpiece to reciprocate the tool back and forth within the bore.

Figures 11, 11A:
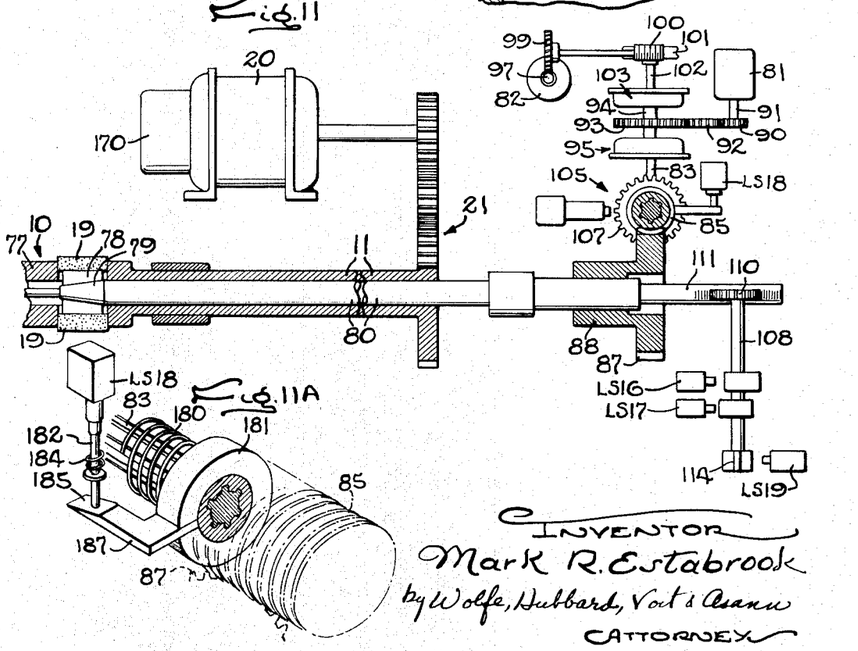
FIG. 11 is a schematic illustration of the hone expanding and contracting mechanism.
FIG. 11A is an enlarged fragmentary perspective view schematically showing part of the expansion mechanism.

During such reciprocation, the usual abrasive sticks or stones 19 on the hone are pressed against the bore wall 13 while the spindle 11 is rotated by an electric motor 20 mounted on the tool head 12 and connected to the spindle through suitable gearing 21 (FIG. 11). Reciprocation of the head along the guide rods 18 is effected by a reversible power actuator which herein comprises a rotary hydraulic motor 22 suitably coupled to the head to slide the latter back and forth as the direction of rotation of the motor is reversed. For this purpose, the shaft 23 of the motor is connected by gearing 24 (FIG. 13) to a drum 25 journaled on the rear portion of the machine base 17 and cooperating with an idler drum 27 (FIG. 13) spaced forwardly along the base to support a cable 28 trained around the two drums and connected to the tool head at 29 (FIGS. 1 and 13) in a well-known manner to slide the head back and forth as the drums oscillate.

CONTROL OF TOOL HEAD RECIPROCATION

Figure 13:
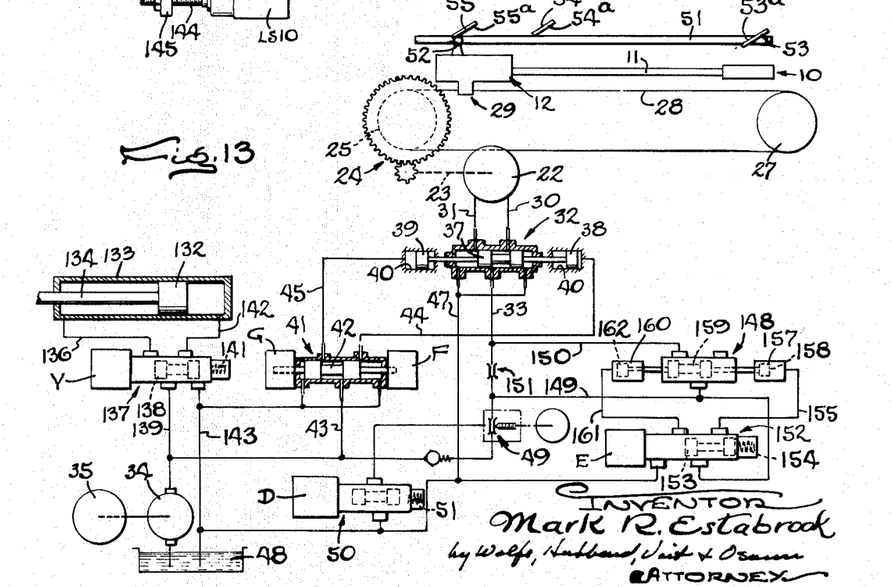
FIG. 13 is a diagrammatic representation of the hydraulic control circuits of the machine.
Figure 14A:
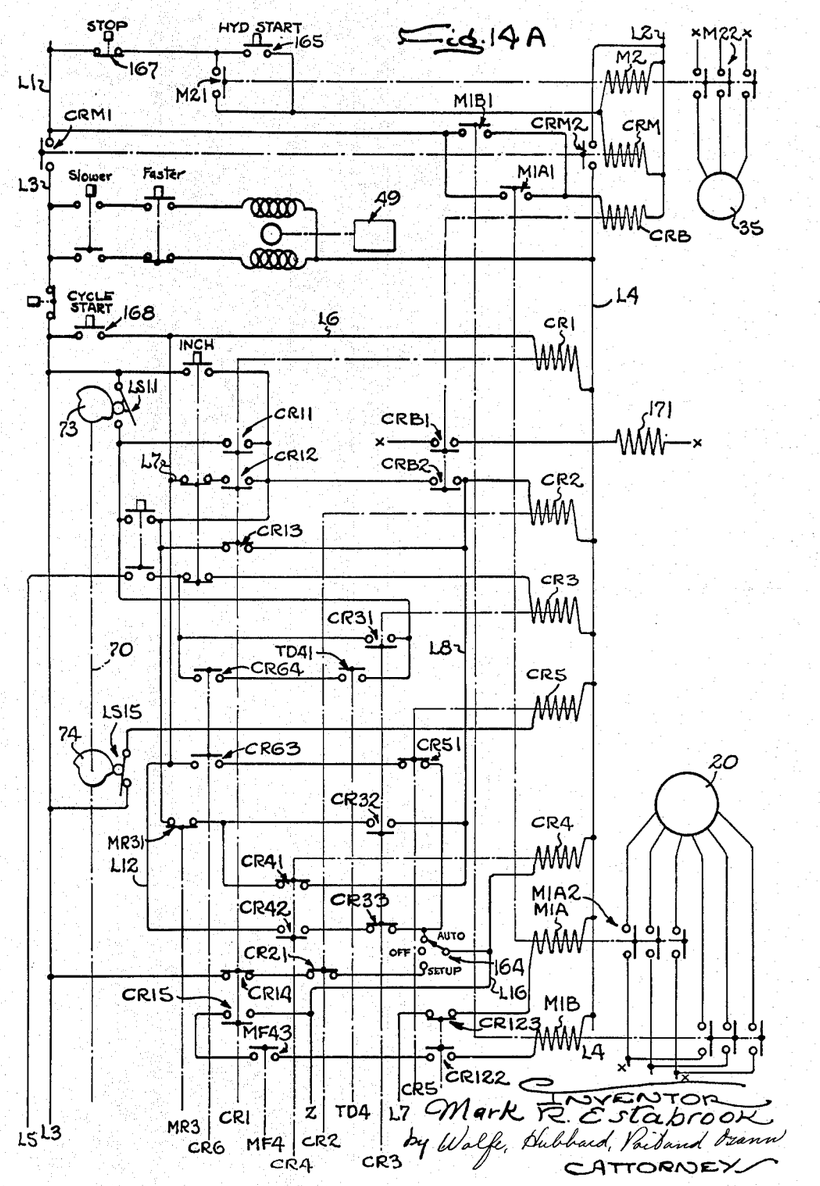
FIG. 14 is a diagrammatic representation of the electrical control circuits of the machine and comprises four sheets, 14A through 14D which may be arranged end to end to form the full figure.

To produce the reciprocation of the tool head 12, fluid under pressure is supplied alternately to opposite sides of the motor 22 through lines 30 and 31 (FIG. 13), the flow through these lines being controlled by a pilot actuated valve 32 receiving pressure fluid through a line 33 communicating with the outlet of a pump 34 driven by a motor 35 (FIGS. 13 and 14A). By shifting the spool 37 of the valve back and forth, the flow through the lines 30 and 31 and through the motor 22 is reversed.

Herein, the spool 37 is shifted back and forth by two single acting pistons 38 and 39 (FIG. 13) fast on opposite ends of the spool and fitted in cylinders 40. Pilot pressure is applied to one end or the other of the spool 37 under the control of a solenoid operated valve 41 including a spool 42 movable back and forth to establish communication between a branch line 43 of the supply line 33 and one of two lines 44 and 45 leading to the cylinders 40.

When a solenoid F is energized, the spool 42 is shifted to the right in FIG. 13 to pressurize the line 44 and thereby shift the piston 38 and the spool 37 to the left to supply fluid to the motor 22 through line 31 while fluid exhausts from the motor through the line 30, the valve 32, and a drain line 47 leading back to the sump 48. Thus, the motor is driven in a direction to advance the tool head 12 toward the workpiece 14. When a solenoid G is energized, the spool 42 is shifted to the left to admit pressure fluid into the line 45 and move the piston 39 and the spool 37 to the right. Accordingly, fluid flows into the motor 22 from the supply line 33 through the line 30 and out through the line 31 to the drain line 47 thereby rotating the motor in a direction to retract the tool head.

The rate of reciprocation of the tool head during rough honing is controlled by adjusting the size of a variable orifice 49 (FIG. 13) in the supply line 33 and thereby increasing or decreasing the rate of flow through the supply line and the motor. A by-pass valve 50 operated by a solenoid D is operable when open to return the pump output from the supply line to the sump 48. The valve is opened by a spring 51 when the solenoid is deenergized and thereby provides an on-off control for the motor 22 by preventing operation of the motor unless the solenoid is energized.

To energize the appropriate solenoid F, G and reverse the direction of rotation of the motor 22 at the end of each forward and return stroke of the tool head 12, an elongated control rod 51 is disposed below the head and journaled on the machine base 17 for back and forth rocking about an axis paralleling the path of reciprocation of the head. Such rocking is produced by a dog 52 (FIGS. 1 and 13) movable with and depending from the tool head and engageable with followers 53, 54 and 55 spaced longitudinally along the rod and projecting upwardly therefrom into the path followed by the dog. The forward follower 53 is positioned to be engaged by the dog when the hone reaches the forward end of the work bore 13 and is formed with a face 53A (see FIGS. 3 and 13) inclined across the path of the dog in a direction to rock the rod clockwise (FIG. 3) as the dog engages the follower. The intermediate follower 54 is formed with an oppositely inclined face 54A and is angularly spaced from the forward follower (see FIG. 3) to be rocked into the return path of the dog when the latter engages the forward follower. As the tool head moves rearwardly, the dog engages the intermediate follower and rocks the rod counterclockwise, such engagement occurring when the hone reaches the rear end of the work bore.

The rear follower 55 is formed with a face 55A inclined in the same direction as the face of intermediate follower 54 but angularly spaced from the latter to lie in the path of the dog 52 after the latter engages the intermediate follower. The rear follower is fast on the control rod 51 adjacent the rear end of the latter and cooperates with the dog to rock the rod farther in a counterclockwise direction when the tool head is fully retracted. The angular relation of the forward and rear followers is such that engagement of the dog with the rear follower rocks the face of the forward follower back into the path of the dog.

Figure 10:
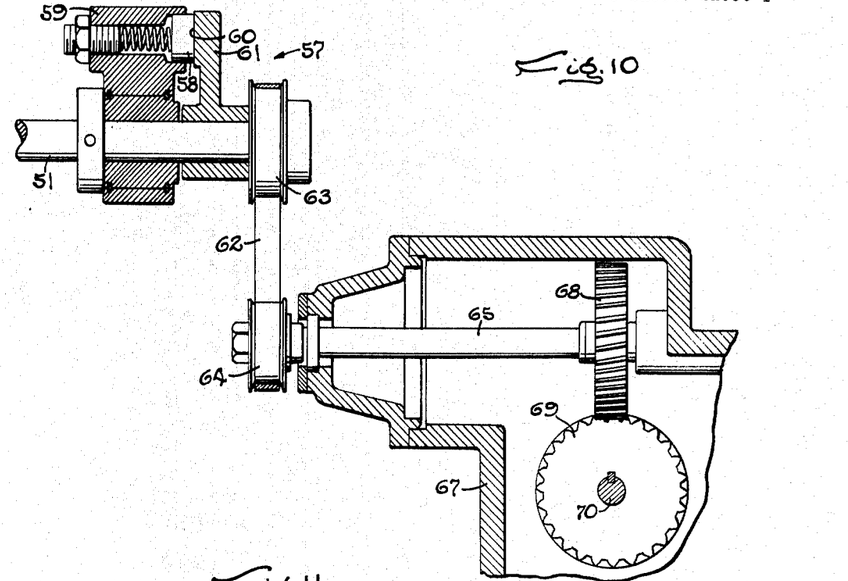
FIG. 10 is a fragmentary sectional view taken along the line 10—10 of FIG. 5.

Adjacent the rear end of the control rod 51 is a device 57 (see FIG. 10) for preventing free rotation of the rod and holding the rod releasably in different angular positions. Herein, this device comprises a plunger 58 slidably guided in a housing 59 fast on the machine base 17 and spring-pressed against a friction face 60 on a lug 61 fast on and projecting radially to one side of the rod. Thus, the plunger and the friction face exert a friction drag for resisting turning of the rod.

Back and forth rocking of the control rod 51 by the dog 52 is utilized to actuate the solenoids F and G of the reversing valve 41 at the appropriate times. For this purpose, an endless belt 62 is trained around a pulley 63 (FIGS. 5 and 10) fast on the rear end of the rod and around a second pulley 64 on a parallel shaft 65 journaled in and projecting from a housing 67 on the machine base. A helical gear 68 keyed to the shaft 65 meshes with a similar gear 69 keyed to a cam shaft 70 journaled in bearings 71 and 72 (FIG. 5) in the housing 67. Thus, the cam shaft is rocked back and forth in unison with the control rod.

Three cams 73, 74 and 75 (FIGS. 5 and 14) spaced longitudinally along the cam shaft 70 are formed with angularly spaced rises for operating switches LS11 and LS15 and companion switches LS13A and LS13B in response to rocking of the control rod 51. During automatic honing, back and forth rocking of the cam shaft 70 with the control rod oscillates the cam 75 back and forth to actuate the companion switches LS13A and LS13B, opening switch LS13A and closing switch LS13B at the end of each forward stroke, and reversing the condition of the switches at the end of each rearward stroke. For purposes to appear later, the angular spacing of the rises of the cams 73 and 74 from the rise of the cam 75 is correlated with the amount of rocking of the control rod 51 and the cam shaft 70 so that the switches LS11 and LS15 are operated only when the tool head 12 is fully retracted and at the end of the first forward stroke of the head thereafter.

Hone structure and expanding mechanism

The hone 10 is of a conventional type comprising two series of abrasive stones 19 angularly spaced around and frictionally held in a body 77 and normally engaging followers 78 of conical cams 79 (FIG. 11). The latter are fast on a rod 80 which extends rearwardly through and is slidable in the spindle 11. When the rod is moved forwardly relative to the spindle, the stones are cammed outwardly and, as the rod is shifted rearwardly, the outward force on the stones is reduced to permit the stones to shift inwardly and reduce the pressure on the bore wall.

Figure 9:
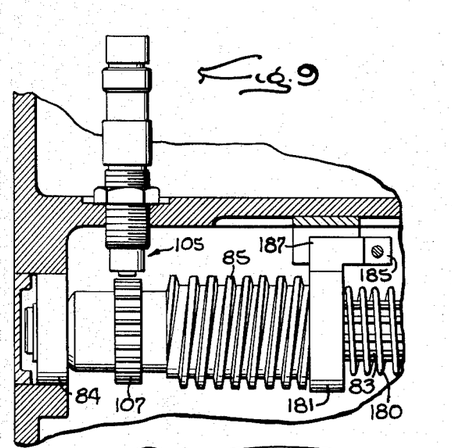
FIG. 9 is an enlarged fragmentary sectional view taken along the line 9—9 of FIG. 7.

While the expander rod 80 may be moved back and forth by various kinds of power actuators, the actuator (FIGS. 7 and 11) shown herein is of the type comprising two reversible electric motors 81 and 82 whose motions are converted into reciprocatory movement of the rod by the mechanism shown schematically in FIG. 11. This mechanism includes a drive shaft 83 (see FIGS. 7, 9 and 11) journaled in bearings 84 (FIG. 9) in the tool head and carrying a worm 85 meshing with teeth 87 formed on the periphery of a nut 88 internally threaded onto the rear end portion of the expander rod. The nut is journaled in thrust bearings 89 (FIG. 7) and is held by the bearings in an axially fixed position relative to the head. Thus, rotation of the drive shaft turns the nut to shift the rod relative to the head and the spindle 11.

In this instance, the motor 81 for producing rapid expansion of the hone 10 is an A.C. motor drivingly connected to the drive shaft 83 through a pinion 90 (FIG. 11) on the motor shaft 91 and an idler gear 92 meshing on one side with the pinion and on the other side with a gear 93 fast on a shaft 94. The latter is journaled in the head and normally is coupled to the drive shaft by a magnetic clutch 95. The speed of the feed motor 82, which herein is a D.C. motor, is reduced through a worm 97 on the motor shaft turning a wheel 99 which, in turn, turns a worm 100 and a wheel 101 fast on a shaft 102. A second magnetic clutch 103, when energized, couples the shaft 102 to the shaft 94.

Figure 7:
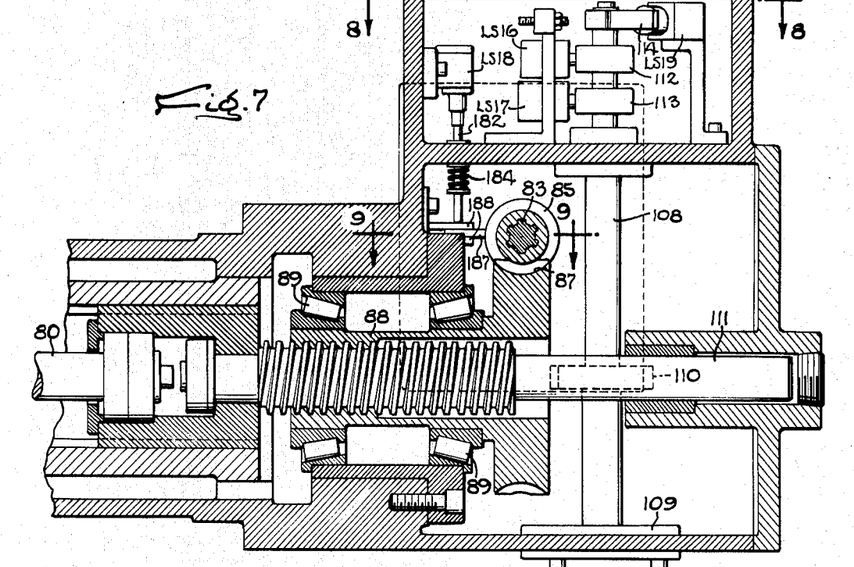
FIG. 7 is an enlarged fragmentary sectional view taken along the line 7—7 of FIG. 1.

The gear ratios are such that when the rapid traverse motor 81 is operating in a direction to move the expander rod 80 forwardly to the left in FIGS. 7 and 11, the diameter of the hone increases at a comparatively rapid rate. For example, the expander rod may be shifted longitudinally at a rapid rate on the order of eight and one-half inches per minute. On the other hand, when the feed motor 82 is operating alone, the expander rod moves at a much slower rate, for example, a maximum of .028 of an inch per minute. The rate of slow expansion of the hone is selected to correspond approximately to the rate of wearing away of the abrasive plus the rate of stock removal in a particular work material. In order to permit selective variation of the rate of slow expansion, the feed motor is energized through a variable transformer T2 (FIG. 14D) which controls the input voltage and speed of the motor. It will be evident that reverse operation of the respective motors results in rapid and slow contraction of the hone.

To avoid wasted time, it is desirable to expand the hone 10 within the work bore at the rapid rate preparatory to a honing operation to bring the stones 19 quickly into positions close to the bore wall 13, and then to expand the hone slowly into high pressure engagement with the wall as the hone begins to rotate and reciprocate. By avoiding full, high pressure engagement with the rough bore at the beginning of the honing operation, the possibility of excessive loading of the hone because of irregularities in the bore size is eliminated. In the past, control of the motors 81 and 82 for such rapid and slow expansion without full engagement at the beginning of honing has required rather complex mechanism for stopping the stones short of the bore wall while adjusting the amount of expansion during service use of a set of stones to compensate for prior wear on the stones.

In accordance with one aspect of the present invention, the motors 81 and 82 are controlled in a novel and relatively simple manner to produce the initial rapid expansion of the hone followed by gradual expansion into high pressure engagement. To these ends, the hone first is expanded into full engagement with the bore wall until a predetermined pressure between the stones and the wall is obtained, and means responsive to such engagement is provided to terminate operation of the rapid traverse motor and initiate reverse or contacting operation of the feed motor for a timed interval long enough to insure that the pressure is reduced to a sufficiently low level before starting continuous slow expansion of the hone along with rotation and reciprocation of the hone.

In this instance, the means responsive to full engagement of the stones 19 with the bore wall 13 includes the clutch 95 (FIGS. 11 and 14D) normally coupling the shaft 94 to the drive shaft 83. Through a potentiometer 104 (FIG. 14D), the enregization of the clutch and the torque the clutch is capable of transmitting are adjustable to obtain slipping of the clutch when the pressure between the stones and the bore wall reaches a selected value. Further, the turning of the shaft 83 during rapid expansion is utilized to condition the control circuits (FIG. 14) for operation of the feed motor. For these purposes, turning of the shaft is sensed by a proximity generator 105 (FIGS. 9 and 14C) energized by the turning of a gear 107 fast on the shaft and operable when energized to generate an electrical signal. As will appear later, a sensitive relay S (FIG. 14) is energized in response to this signal, and starts the feed motor in a direction to contract the hone.

When the stones 19 engages the bore wall and the clutch 95 slips to stop the turning of the worm 85 and the shaft 83, the sensitive relay is deenergized, stopping the rapid traverse motor 81 and energizing the feed clutch 103 to couple the shafts 94 and 102 together whereby the feed motor 82 begins to contract the hone. After a short interval of contraction determined by a timer TD2 energized in response to slipping of the clutch, the direction of operation of the feed motor is reversed to initiate slow hone expansion which continues throughout the rough honing operation.

Figure 8:
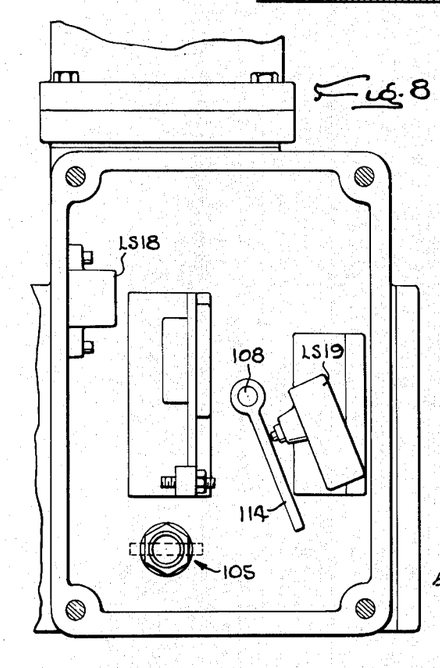
FIG. 8 is a fragmentary sectional view taken along the line 8—8 of FIG. 7.

Control switches LS16, LS17, LS19A and LS19B are operated as the expander rod 80 moves forwardly to condition the circuits for energization of the various relays at the appropriate times. For this purpose, the switches are arranged along an upright shaft 108 (FIGS. 7, 8 and 11) disposed on one side of the expander rod and journaled in bearings 109 (FIG. 7) in the head. A pinion 110 fast on the shaft meshes with the teeth of a rack 111 formed on the expander rod whereby the shaft is rotated as the rod moves and turns the pinion. Operator arms 112, 113 and 114 mounted on the pinion shaft for rotation therewith operate the switches LS16, LS17, LS19A and LS19B at different times during the expansion of the hone to control the circuits of the feed and rapid traverse motors as the hone is expanded.

In this instance, switch LS16 is closed by the arm 112 as the rod 80 starts to move forwardly, and companion switches LS19A and LS19B are operated by the arm 114 after a small amount of rod movement. Switch LS17 is closed by the arm 113 only after the hone 10 has been expanded fully and thereby provides a safety control preventing further operation of the hone. For a purpose to appear later, the arm 114 is mounted to slip on the shaft as the latter continues to rotate after closure of switch LS19B.

The construction and manner of operation of the proximity generator 105 and sensitive relay S are well known to those skilled in the art. For example, the generator may be of the type sold by Electro Products, Inc., Chicago, Illinois, as model No. 3040 and the relay may be of the type sold by Cutler Hammer under Bulletin 13535H2.

With this novel method of controlling the motors 81 and 82, it will be seen that the stones 19 are shifted rapidly into engagement with the bore wall 13 before rotation and reciprocation are started, and are protected against excessive initial pressure by the slipping of the clutch 95. Moreover, such slipping is sensed and utilized to terminate rapid expansion and initiate slow contraction for a timed interval sufficient to reduce the pressure between the stones and the work bore to the desired amount for starting of the honing. Thus, excessive working pressure is avoided in a relatively simple manner and without undue delay.

*Rough honing cycle*

Through the circuitry to be described, the energization of the hydraulic motor 22, the spindle motor 20, and the hone expanding and contracting motors 81 and 82 is controlled to produce a cycle of machine operation including the steps of advancing the collapsed hone 10 into the bore of a workpiece 14 clamped in the fixture 15, rapidly expanding the hone into engagement with the bore wall 13, slowly contracting the hone to reduce the starting pressure, and then slowly expanding the hone while reciprocating the same at a rapid rate throughout the length of the bore and rotating the hone at a relatively slow, rough honing speed. In this manner, relatively high pressure is maintained between the abrasive stones 19 and the bore wall until the bore is enlarged to the desired size.

Figure 12:
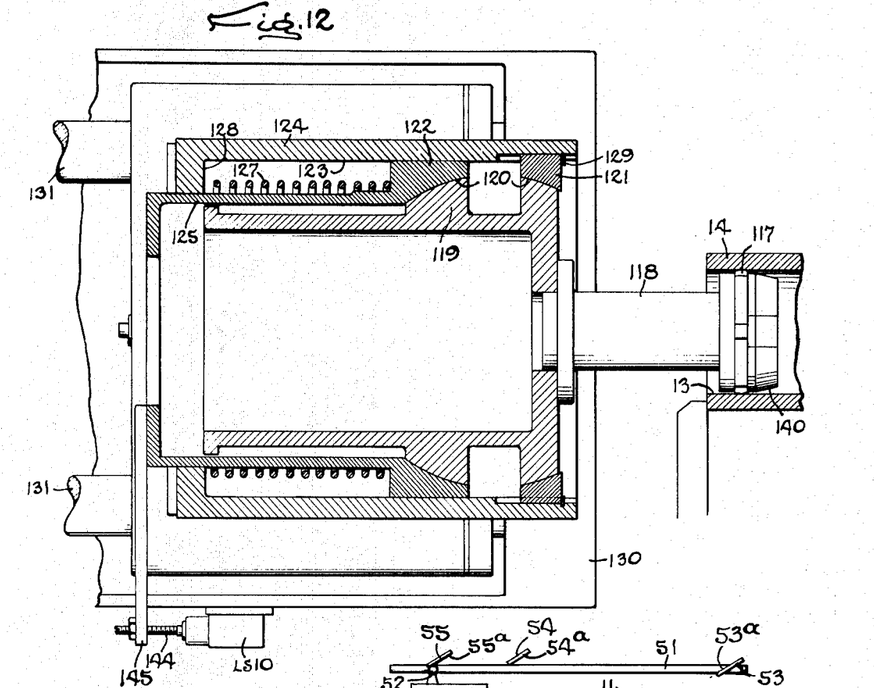
FIG. 12 is an enlarged fragmentary section taken along the line 12—12 of FIG. 4 with the parts in different positions.

In the present instance, rough honing is terminated by a sizing device 115 (FIGS. 4 and 12) which gages the work bore 13 during the course of the honing operation and produces a suitable signal such as the closure of a switch LS10 when the bore attains the desired size. Herein, the sizing device includes a plug 117 fast on one end of a rod 118 mounted on the machine base 17 adjacent the forward end of the workpiece for reciprocation along the axis of the bore toward and away from the workpiece, the plug having an external diameter equal to the desired bore diameter.

To support the plug 117 on the base, a ball 119 (FIG. 12) of spherical contour is fast on the end of the rod 118 opposite the plug and is fitted closely in mating surfaces 120 formed on two rings 121 and 122 telescoped into a bore 123 in a housing 124 slidably guided on the base. The ring 122 is formed integrally with a sleeve 125 smaller than the bore 123 and projecting outwardly through the left end thereof. A coiled spring 127 telescoped over the sleeve and compressed between the ring 122 and an internal annular shoulder 128 encircling the left end (FIG. 12) of the bore urges the ring 122 and the ball toward the right and into the position shown in FIG. 12 where the ball presses the ring 121 against a snap ring 129 seated in a groove encircling the right end of the bore. In this position, the rod projects outwardly toward the adjacent end of the workpiece.

The housing 124 is guided for sliding back and forth on a pedestal 130 along horizontal guide rods 131 to carry the plug toward and away from the workpiece. Such sliding is effected in timed relation with the hone reciprocation to advance the plug toward the work during each return stroke of the hone. This is accomplished by a suitable power actuator herein comprising a piston 132 (FIGS. 4 and 13) fitted in a cylinder 133 formed in the pedestal 130 with its axis paralleling the work axis, the piston rod 134 being secured to a lug 135 fast on the housing.

Pressure fluid from the pump 34 is delivered to the rod end of the cylinder 133 during each return stroke of the hone 10 through a valve 137 (FIG. 13) operated by a solenoid Y which is energized along with the return solenoid G of the valve 41. When the solenoid Y is energized, the spool 138 of the valve establishes communication between a line 136 leading to the rod end of the cylinder 133 and a fluid supply line 139 communicating with the pump. Accordingly, the housing 124 and the plug 117 are advanced toward the workpiece.

As the housing slides toward the work, the leading end of the plug, which preferably is tapered at 140 (FIG. 12), enters the bore 13. The rings 121 and 122 cooperate to define a socket for the ball 119 permitting the plug to swivel and aline itself precisely with the bore. If the bore is undersize, the plug enters only partially and stops as the housing continues toward the work, the ball, the ring 122, and the sleeve 125 yielding relative to the housing as permitted by the spring 127. Then, as the head begins its forward stroke, the solenoid Y is deenergized with the return solenoid G and the spool 138 is returned to the position shown in FIG. 13 by a spring 141 so that fluid flows from the line 139 to a line 142 and thence to the head end of the cylinder 133 while the fluid in the rod end of the cylinder is exhausted through the line 136 and a drain line 143. Thus, the plug is withdrawn.

When the work bore finally attains full size, the plug slides completely into the bore 13. The signal switch LS10 is mounted on the pedestal 130 alongside the housing 124 and is operated by an adjustable dog 144 (FIG. 4) carried by a bracket 145 fast on and projecting laterally from the left end of the sleeve 125. The dog engages the switch only when the plug is fully inserted, and the signal produced by closure of the switch is utilized to control the machine circuits and terminate rough honing. Herein, a stroke counter 147 (FIG. 14) is provided to count a number of additional strokes after the plug first enters the bore, the number of additional strokes being preselected to compensate for wear on the sizing plug in service use.

THE FINISHING CYCLE

Heretofore, rough honed work bores have been finish honed in several ways, for example, by terminating expansion of the hone and allowing the pressure on the bore wall to "play out," by collapsing the hone and then re-expanding it into relatively low pressure engagement with the bore wall for a supplementary honing cycle, and by substituting a finer grit abrasive for the relatively coarse abrasive used in rough honing.

I have discovered that the performance of abrasive stones 19 of a given coarseness rating varies with the speeds of rotation and reciprocation of the hone as well as with the pressure with which the stones are pressed against the bore wall. Specifically, with a relatively coarse abrasive such as C180L grit suitable for rough honing, a reduction in the usual rough honing pressure and an accompanying reduction in the rate of reciprocation make it possible to polish a bore to a finer finish and in a shorter period of time than previously has been possible. It is believed that both the reduction in honing pressure and the reduction in the rate of reciprocation reduce the shearing forces on the exposed grit and the tendency to pull the grit from the stones. Accordingly, instead of shearing off or pulling out of the stones to expose new grit, the exposed grit is worn away and the sharp edges thereof are dulled or rounded to polish the wall rather than scratch it. I also have discovered that, contrary to what might be expected, a moderate increase in the speed of rotation of the hone can result in improved polishing and further reduce the time required for polishing.

In putting these discoveries into practice, I have provided a honing machine in which the actuators for reciprocating, rotating, expanding and collapsing the hone 10 are controlled in a novel manner to initiate and carry out an improved finish honing or polishing cycle, with the same abrasive used to rough hone the work bore 13 and automatically in response to attainment of the desired finished bore size, by reducing both the honing pressure on the bore wall and the rate of reciprocation of the hone. To obtain a further reduction in the amount of finishing time required and improve the finish obtained, the speed of rotation of the spindle 11 may be increased.

In this instance, the electric motor 20 for rotating the spindle is of the type having both high-speed and low-speed windings so as to be capable of rotating the hone 10 at different speeds during the roughing cycle and the finishing cycle. Preferably, the higher speed of the motor is adjustable to obtain a finishing speed on the order of ten to fifteen percent faster than the lower speed. For example, the lower roughing speed may be 1800 r.p.m. while the higher finishing speed is approximately 2000 r.p.m.

Similarly, control means is provided for controlling the energization of the hydraulic motor 22 to produce both rapid and slow reciprocation of the head 12. Herein, this control means includes a valve 148 (FIG. 13) which opens and closes a passage through lines 149 and 150 by-passing a second restrictive orifice 151 in the fluid supply line 33. During normal, rapid reciprocation of the head, the valve 148 is open and fluid from the pump 34 flows to the motor 22 through the variable orifice 49 which determines the rapid rate of fluid flow, through the valve and the by-pass lines, and then through supply line 33 to the reversing valve 32. When the valve 148 is closed, however, the fluid must pass through the second orifice 151 which reduces the rate of flow into the supply line and thereby reduces the speed of rotation of the motor 22.

Opening and closing of the valve 148 is controlled by a valve 152 operated by a solenoid E. When the solenoid is deenergized, the spool 153 of the valve is positioned by a spring 154 as shown in FIG. 13 to establish communication between a branch line 155 and a cylinder 157 fitted with a piston 158 fast on the spool 159 of the valve 148. The piston and the spool are shifted to the left (FIG. 13) to open the valve for normal, rapid reciprocation of the head. When the solenoid E is energized, however, the spool 153 is shifted to the left to establish communication between the pump and a cylinder 160 through a branch line 161. The piston 162 in this cylinder shifts the spool 159 to the right to close the valve 148 and block the by-pass lines. Thus, fluid can flow to the motor only through the second orifice 151 at the reduced rate. The rate of rapid reciprocation is on the order of 80 to 85 feet per minute while the slow rate of reciprocation is on the order of 20 to 25 feet per minute.

The reduction in honing pressure may be achieved in various ways, for example, by first contracting the hone to shift the stones 19 away from the bore wall and then reexpanding the hone into engagement with the bore wall with a selected reduced pressure. To terminate rapid expansion when the selected reduced honing pressure is obtained, the worm 85 is splined on the drive shaft 83 and is urged toward and held against a stop adjacent the bearing 84 by a spring 180 coiled around the drive shaft and acting between an adjustable collar (not shown) thereon and a sleeve 181 journaled on one end of the worm. The stress of the spring may be adjusted by adjusting the collar to vary the torque or expanding force at which the worm and the sleeve yield along the drive shaft after engagement of the stones and the bore wall.

Yielding of the worm 85 is sensed by a control switch LS18 (See FIGS. 7, 9, 11A and 14C) whose contacts are housed within a casing supported on a wall of the head 12 (See FIG. 7) for engagement of the switch actuator with a plunger 182 slidable vertically in a partition 183 and urged by a spring 184 downwardly and against a cam surface 185 on a horizontal finger 187 carried by and movable with the sleeve 181. Guides 188 (FIG. 7) above and below the finger prevent turning of the latter and the sleeve. When the worm is in its normal axial position against the stop collar, the plunger 182 engages a low point on the cam, thus allowing the switch LS18 to remain closed. In the initial yielding of the sleeve following engagement of the stones and the bore wall, the finger is shifted to the left (FIG. 11A) to lift the plunger and open the switch which deenergizes the motor 81 with the stones 19 pressed against the bore wall with a pressure determined by the stress of the spring 180. For additional details of such a control device, reference is made to Seborg et al. Patent No. 2,780,893.

Figure 15:
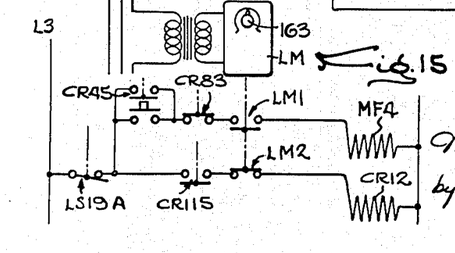
FIG. 15 is a fragmentary diagrammatic representative of an alternate form of a portion of the control circuits.

An alternative device for effecting the honing pressure reduction, shown in FIG. 15, senses the contraction of the hone and terminates such contraction when the selected reduced pressure is obtained. In this instance, the pressure between the stones 19 and the bore wall 13 is sensed by a load meter LM (FIG. 15) which measures the current drawn by the spindle motor 20 and stops the feed motor when the current falls to a preselected value. Such load meters are well-known in construction and operation and for this reason the meter LM is shown only diagrammatically herein. Generally, the meter chosen for purposes of illustration includes a relay (not shown) which is energized when the current drawn by the spindle motor passes the level selected by the adjustment of a knob 163, the relay then closing switches LM1 and LM2 which prepare the control circuits for the eventual finishing cycle. Then, when the current falls back to the selected value as the feed motor contracts the hone, the relay is deenergized and its switches open to deenergize the feed motor with the stones pressed against the bore wall with the desired reduced pressure. One suitable load meter relay for this purpose is that sold by Assembly Products, Inc., of Chesterland, Ohio, as Part No. 461–CMR.

THE CONTROL CIRCUITS AND AUTOMATIC OPERATION

Typical circuitry for controlling the honing operation is shown in FIG. 14. When all the control circuits are deenergized, the various relays will be deenergized and the switches thereof positioned as shown in FIG. 14. With the tool head 12 fully retracted, the hone 10 collapsed, the spindle drive motor 20 stopped, a workpiece 14 to be honed clamped in the work fixture 15, and a switch 164 set for automatic operation as shown in FIG. 14A, the machine is started by manually closing a start switch 165 which completes a circuit through a normally closed stop switch 167 and two relays M2 and CRM across two electric power lines L1 and L2 connected to a suitable power source (not shown). Relay M2 closes its switches M22 for energizing the hydraulic pump motor 35 and also closes a switch M21 to complete a holding circuit. Relay CRM closes its switches CRM1 and CRM2 to connect the power lines to lines L3 and L4 thereby completing circuits through rectifiers R1 (FIG. 14B), and R3 and R4 (FIG. 14D), and through a transformer T1 (FIG. 14C) for the sensitive relay S, and the variable transformer T2 (FIG. 14D) controlling the forward speed of the feed motor 82. Through the rectifier R4, the slip clutch 95 and the feed clutch 103 are energized.

Advancing the hone into the workpiece

Figure 14B:
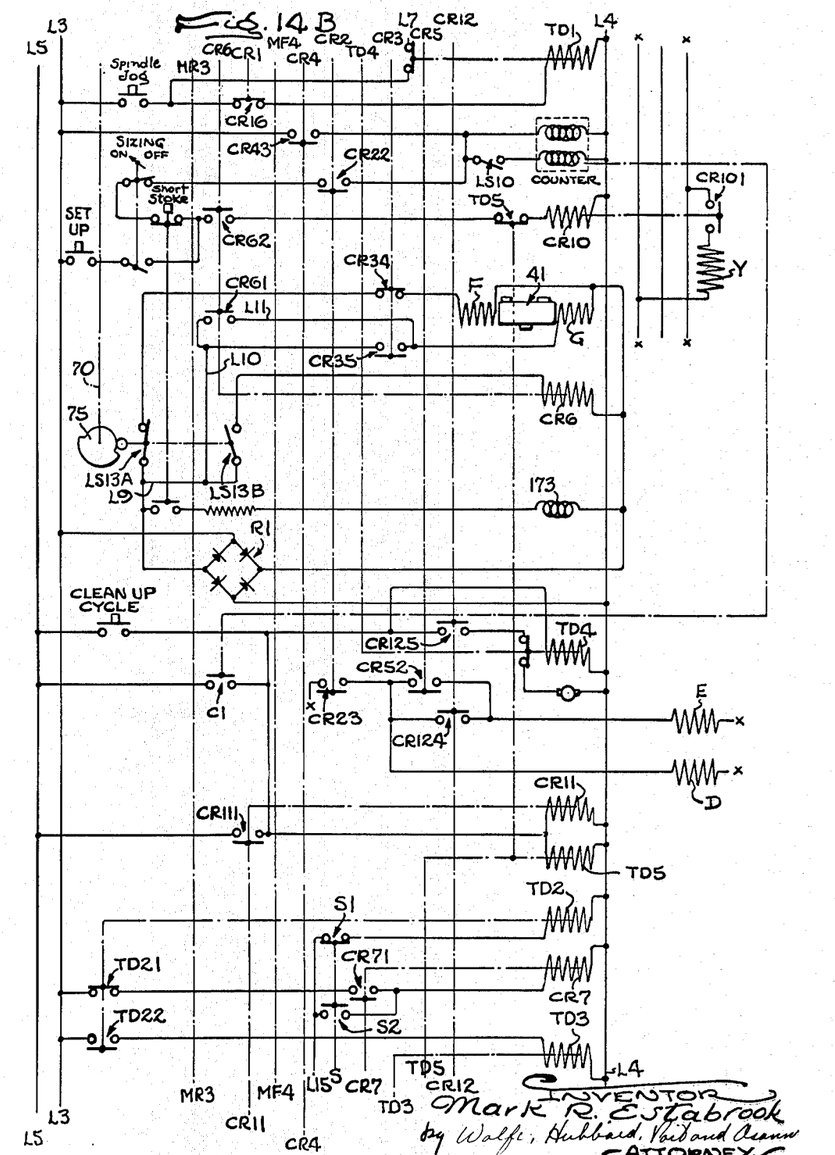
Figure 14C:
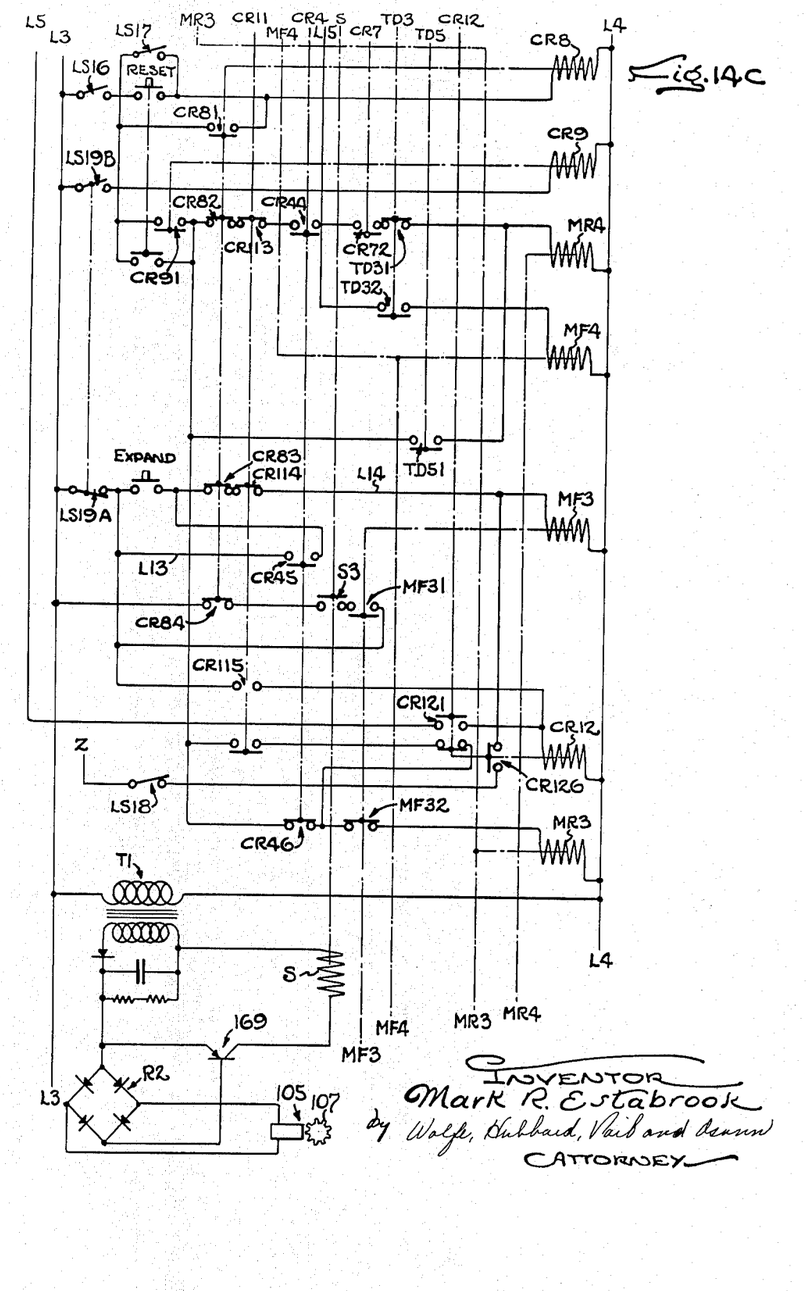

With the tool head 12 fully retracted, the dog 52 thereon is in engagement with the rear follower 55 on the control rod 51 thereby positioning the cams 73, 74 and 75 and holding the switches LS11, LS13A, LS13B and LS15 in the positions shown in FIG. 14B, switches LS11 and LS13B being open and switches LS13A and LS15 being closed. Switch LS13A completes a circuit from the rectifier R1 through a switch CR34 and the forward solenoid F of the valve 41 thereby conditioning the latter to produce a forward stroke of the tool head when reciprocate solenoid D is energized to close the by-pass valve 50 (FIG. 13). When switch LS15 is closed, a relay CR5 (FIG. 14A) is energized and closes its switch CR52 in the circuit of the slow reciprocate solenoid E which remains deenergized until the circuit is completed by a closure of a presently open switch CR23.

To start the tool head toward the workpiece, a cycle start switch 168 is closed manually to energize a relay CR1 through line L6 and a second relay CR2 through line L7, presently closed switches CR12, MR31 and CR41, and line L8. Relay CR2 closes its switch CR23 to energize the slow reciprocate solenoid E through switch CR52, and also energizes reciprocate solenoid D to close the by-pass valve 50. Accordingly, fluid flows to the hydraulic motor 22 at the slow rate determined by both the orifices 49 and 151 and flows through the motor in a direction to advance the tool head slowly toward the workpiece.

Figures 1, 2, 3, 4:
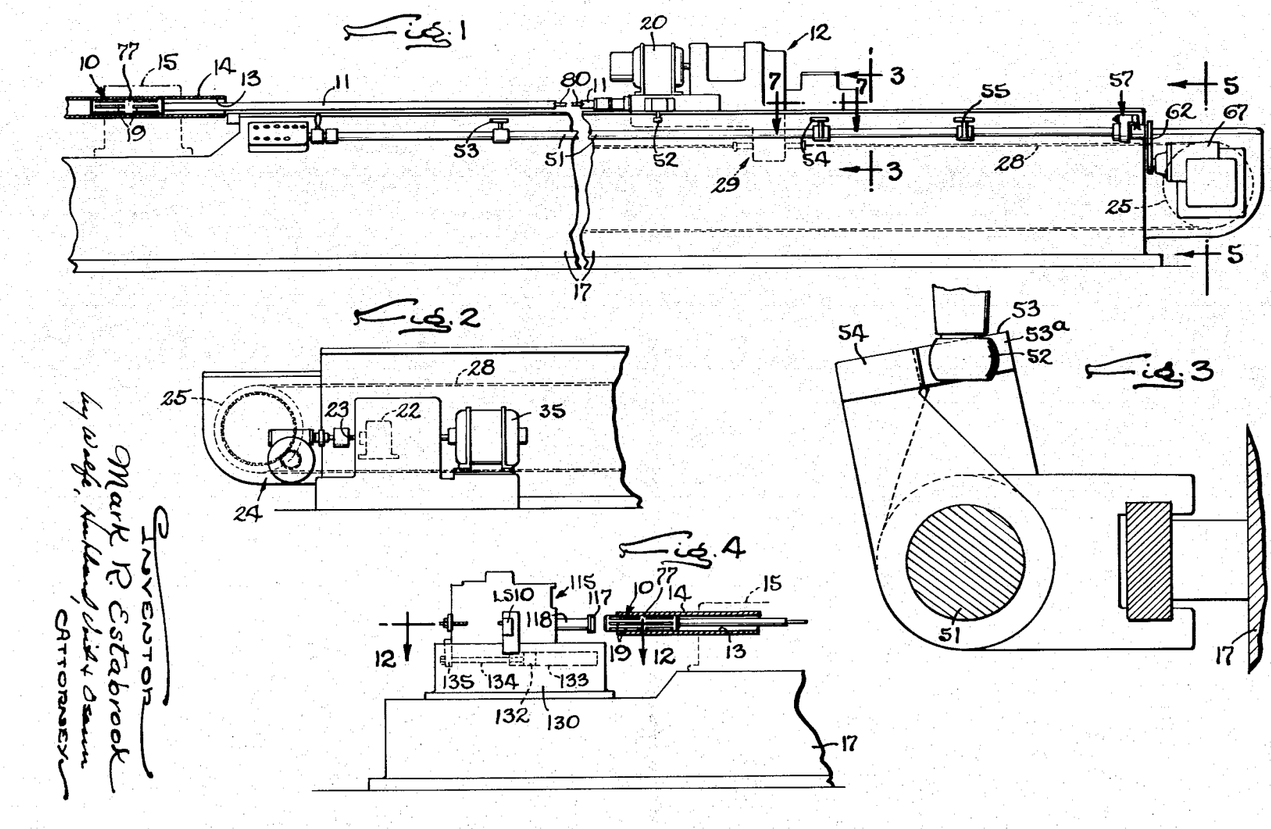
FIGURE 1 is a fragmentary side elevational view of a honing machine embodying the novel features of the present invention.
FIG. 2 is a fragmentary side elevational view taken from the opposite side of one end of the machine shown in FIG. 1.
FIG. 3 is an enlarged fragmentary sectional view taken along the line 3—3 of FIG. 1.
FIG. 4 is a fragmentary side elevation of the other end of the machine shown in FIG. 1 taken from the same side as FIG. 1 with the parts in different positions and with some parts broken away and shown in section.

The start switch 168 is held closed as the hone enters the bore and slides along the latter toward the extreme forward position shown in FIG. 4. As the hone enters the work bore, the dog 52 passes the intermediate follower 54 which is positioned as shown in FIG. 3 out of the path of the dog. When the hone reaches the extreme forward position, the dog engages the forward follower 53 and rocks the control rod clockwise (FIG. 3) to turn the cam shaft 70 counterclockwise as viewed in FIGS. 6 and 14 far enough to open switches LS13A and LS15 and close switches LS11 and LS13B. The intermediate follower rocks back into the return path of the dog to be engaged thereby during the next rearward stroke of the tool head.

Closure of switch LS11 completes a holding circuit for relay CR1 through now closed switches CR11, CR12, and lines L7 and L6, and closure of switch LS13B completes a circuit to energize relay CR6 (FIG. 14B) which closes its switch CR61 and thereby completes a circuit from the rectifier R1 through lines L9, L10 and L11 to the return solenoid G of the valve 41 to condition the latter for reverse rotation of the hydraulic motor 22. Opening of switch LS13A simultaneously deenergizes the forward solenoid F.

At the same time, closure of a switch CR63 (FIG. 14A) by relay CR6 completes a circuit to a relay CR4 through line L7, switch CR51, and the automatic cycle switch 164. Relay CR4 opens its switch CR41 thereby deenergizing relay CR2 which opens its switch CR23 to deenergize the reciprocate solenoid D and stop the tool head with the hone 10 positioned as shown in FIG. 4. Closure of a switch CR43 conditions the stroke counter 147 (FIG. 14B) for later operation.

Expanding the hone

To initiate rapid expansion of the hone 10, a switch CR45 is closed by relay CR4 to energize a relay MF3 through switch LS19A and lines L13 and L14 as the tool head 12 stops. A switch CR42 closes to hold relay CR4 through lines L12 and L7, and relay MF3 closes its switch MF31 to complete a holding circuit and closes its switches MF33 (FIG. 14D) to energize the rapid traverse motor 81 in a direction to expand the hone rapidly into engagement with the bore wall. Opening of a switch MF34 as the motor is energized simultaneously deenergizes the feed clutch 103 to uncouple the feed motor 82 from the shaft 94.

As the shaft 83 and gear 107 begin to rotate, the sensitive relay S is energized by the transformer T1 in response to the signal generated by the magnetic pickup 105 and applied to a transistor 169 which completes a circuit to the relay S. The latter opens a switch S1 while closing switches S2 and S3. As the expander rod 80 is shifted forwardly and the rack 111 rotates the pinion 110 and the shaft 108, switch LS16 (FIGS. 11 and 14C) closes and, after a short delay, switch LS19A is opened as its companion switch LS19B is closed to energize a relay CR9 and close its switch CR91. The latter completes a circuit to relay CR7 through now closed switches LS16, CR82, CR11–3, CR44 and line L15, and relay CR7 closes its switches CR71 and CR72.

Figure 14D:
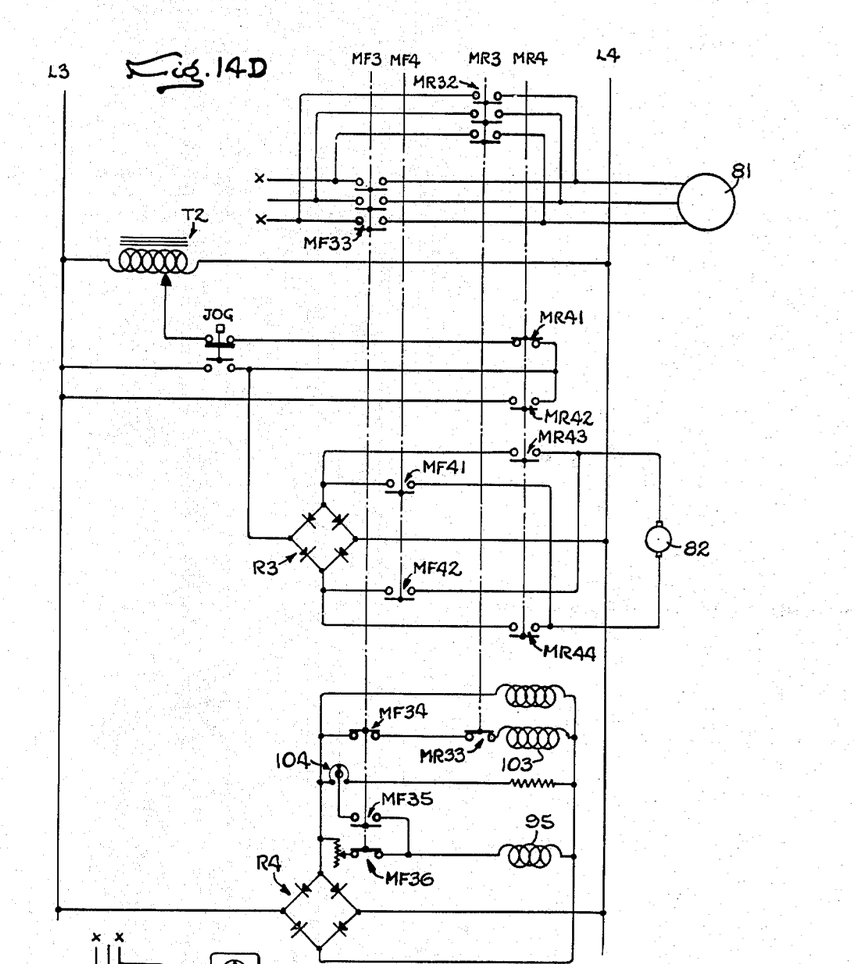

Switch CR71 completes a holding circuit and switch CR72 energizes a relay MR4 through switch LS16, thereby starting the feed motor 82 reversely upon closing of switches MR43 and MR44 (FIG. 14D). Simultaneous opening of switch MR41 and closing of switch MR42 disconnects the rectifier R3 from the variable transformer T2 and connects the rectifier across lines L3 and L4 whereby the speed of the feed motor is determined by the voltage input from line L3 rather than from the transformer T2. Since the feed clutch 103 is deenergized, the feed motor runs idly as rapid hone expansion continues.

When the abrasive stones 19 engage the bore wall 13, however, the worm 85 shifts along the shaft 83 to open switch LS18, followed closely by slipping of the clutch 95 which stops turning of the gear 107 and thereby deenergizes relay S. Accordingly, switch S1 recloses to complete a circuit to a timer TD2 through line L15 and switches CR44, CR11–3, CR82, CR91 and LS16. At the same time, switch S3 opens to deenergize relay MF3 and stop the rapid traverse motor 81 by opening switches MF33 while closing switch MF34 to energize the feed clutch 103 and couple the feed motor 82 to the shaft 94. Thus, the feed motor immediately begins to contract the hone and reduce the initial high pressure engagement between the stones and the bore wall. Switch LS18 closes idly as contraction begins and remains closed until the finishing portion of the cycle is started. The circuit to relay MF3 through switch LS18 remains open until switch CR12–6 closes at the end of rough honing.

After the preselected timer interval, the timer TD2 times out and opens its switch TD21 to deenergize relay CR7 which opens switch CR72 to deenergize relay MR4 and stop the reverse operation of the feed motor. The timer TD2 also closes switch TD22 to energize another timer TD3. The latter times out after a short interval such as one-half second and closes its switch TD32 to energize a relay MF4 which closes its switches MF41 and MF42 to complete a circuit from the rectifier R3 to the feed motor 82 to run the latter forwardly and initiate slow expansion of the hone, the input to the rectifiers being through the transformer T2 and now closed switch MR41 so that the feed motor runs at a speed determined by the setting of the variable transformer.

*Reciprocating and rotating the hone*

In addition to starting the hone expansion, relay MF4 closes its switch MF43 (FIG. 14A) to energize a relay M1A through a normally closed switch CR123, switch CR15, line L16, automatic cycle switch 164, and lines L12 and L7. Relay M1A closes a switch M1A1 to energize a relay CRB which releases a spindle brake 170 (FIGS. 1 and 11) by energizing the brake solenoid 171 (FIG. 14A) through a switch CRB1, and reenergizes relay CR2 by closing a switch CRB2. Relay CR2 closes the switch CR23 in the circuit of the reciprocate solenoid D to start the hydraulic motor 22 to shift the tool head 12 rearwardly. At the same time, closure of switches M1A2 starts the spindle motor 20.

Accordingly, the hone 10 is moved rearwardly through the work bore 13 while being expanded gradually and rotated at slow speed. Since the relay CR5 and slow reciprocate solenoid E remain deenergized, fluid flows to the hydraulic motor 22 through the by-pass lines 149 and 150 to reciprocate the tool head at the rapid rate. When the dog 52 engages the intermediate follower 54 and rocks the control rod 51 counterclockwise (FIG. 3), the cam 75 returns the switches LS13A and LS13B to the condition shown in FIG. 14 to energize the forward solenoid F and start another forward stroke of the tool head. Thus, the latter reciprocates back and forth under the control of the forward and intermediate followers and the expander rod 80 is shifted slowly forwardly to maintain the honing pressure on the bore wall. As the shaft 108 turns, the arm 114 slips thereon to remain stationary relative to switch LS19B while holding the latter closed.

*Initiation of the finishing cycle*

Each time relay CR6 is energized by closure of switch LS13B at the end of a forward stroke of the tool head 12, a switch CR62 closes to energize a relay CR10 which closes its switch CR10–1 to energize solenoid Y (FIGS. 13 and 14B) and admit fluid to the sizing plug cylinder 133 through the hydraulic line 136. Thus, the plug 117 is advanced toward the end of the workpiece and attempts to enter the bore 13. When switch CR62 reopens during the next forward stroke of the tool head, relay CR10 and solenoid Y are deenergized and the sizing plug is retracted to the out-of-the-way position as the hone is moved forwardly.

When the work bore finally attains the size of the outer diameter of the sizing plug 117, the latter enters the bore and the dog 144 closes the signal switch LS10. This completes a circuit to the solenoid of the stroke counter 147 to begin counting the number of additional strokes selected to compensate for wear on the sizing plug. When these additional strokes are completed, the counter closes its switch C1 to energize relay CR11 and timer TD5. A switch CR11–1 is closed by the relay CR11 to maintain the energization of circuits to the relay and the timer and another switch CR11–3 is opened to deenergize relay MF4 and stop the expansion of the hone.

Another switch CR116 is also closed, completing a circuit through CR127 to the relay MR3 which is energized. The switches MR32 are thereby closed to run the rapid traverse motor 81 reversely and collapse the hones until the switch LS19B is engaged and opened.

Closure of LS19A completes a circuit to a relay CR12 through now closed switch CR11–5, and relay CR12 closes its switch CR12–6 in the circuit of relay MF3 through switch LS18, starting the traverse motor 81 to expand the hone until the worm 85 shifts, opening LS18 and stopping expansion with the stones pressed lightly against the wall. CR12 also closes a holding switch CR12–1 and opens a switch CR12–3 (FIG. 14A) to deenergize relay M1A and open switches M1A2 in the low-speed circuit of the spindle motor 20. At the same time, relay CR12 closes its switch CR12–2 to energize a relay M1B whose switches M1B2 energize the high-speed winding of the spindle motor to accelerate the spindle. Further, a switch CR12–4 (FIG. 14B) closes to energize the slow reciprocate solenoid E and a switch CR12–5 closes to energize the timer TD4 which times the finishing cycle.

Thus, the tool head 12 begins to reciprocate the hone 10 slowly through the bore with the abrasive stones 19 pressed only lightly against the bore wall and rotating at an increased speed. As a result, the stones polish the bore wall quickly to a fine, even finish while removing very little stock. The timer TD4 is set to time out after the interval of time selected for the finishing cycle. The length of the cycle, of course, will vary with the length and diameter of the bore and the fineness of finish required. When the timer times out, it closes a switch TD41 in the circuit of a withdraw relay CR3 which is energized at the beginning of the next rearward stroke of the tool head upon the closure of switch CR64 by the relay CR6 energized through switch LS13B.

Relay CR3 closes a switch CR31 to complete a holding circuit and also closes a switch CR32 to maintain the energization of the reciprocate relay CR2 as switch CR33 opens to deenergize the hone expansion relay CR4. The latter recloses a switch CR46 to energize the hone collapsing relay MR3 and initiate the rapid collapse of the hone by the traverse motor 81, at the same time opening switch MR33 to deenergize the feed clutch 103 and uncouple the feed motor 82 from the shaft 94. When switch LS19B is opened by the arm 114 as the expander rod 80 moves rearwardly, the motor is deenergized with the hone collapsed sufficiently to slide out of the work bore.

To maintain the energization of the return solenoid G as the dog 52 passes the intermediate follower 54 and opens the switch LS13B, relay CR3 also closes a switch CR35 which completes a holding circuit for the return solenoid through line L10, and opens a switch CR34 to prevent the energization of the forward solenoid F. Thus, the tool head 12 continues rearwardly until the dog engages the rear follower 55 and rocks the control rod 51 counterclockwise (FIG. 3) to return the cam shaft 70 and the cams 73, 74 and 75 to the positions shown in FIG. 14. Accordingly, the cam 73 opens switch LS11 to stop the machine.

With the modified control using the load meter LM shown in the fragmentary circuit in FIG. 15 in place of the shiftable worm 85 and control switch LS18, the relay of the meter is energized to close its switch LM1 in the circuit of relay MR4 as long as the stones 19 are in high pressure engagement with the bore wall during rough honing. A second switch LM2 is open in the circuit of relay CR12. When switch CR11-3 is opened at the end of rough honing, and the honing pressure drops off as a result of deenergization of the feed motor 82, the load meter relay is deenergized at a preselected reduced pressure indicated by the reduced current drawn by the spindle motor, thereby closing the switch LM2 to energize the relay CR12 to initiate the finishing cycle.

Appropriate manual controls are provided for terminating or varying the automatic cycle when desired. These controls include a short-stroking switch 172 for actuating a clutch 173 (FIGS. 5 and 14B) operable to couple the drum shaft directly to the cam shaft 70 so that the latter is rocked back and forth with the drum to effect short stroking of selected areas of the work bore 13.

I claim as my invention:

1. In a machine for honing the bore wall of a workpiece, the combination of, a tool head, a spindle journaled on said head and projecting outwardly therefrom for rotation about a predetermined axis, a radially expansible and contractible honing tool on said spindle, means supporting said head for back and forth reciprocation along a path paralleling said axis to reciprocate said tool along the bore wall, a first power actuator for reciprocating said head and having high and low speeds of operation, a second power actuator for rotating said spindle, a reversible power actuator for expanding and contracting said tool, means for controlling said actuators to effect simultaneous rotation, high speed reciprocation and gradual tool expansion for rough honing the bore wall, sizing means for indicating when the bore wall attains a predetermined size, and additional control means activated by said sizing means when said predetermined size is attained and operable when activated to control said actuators to contract said tool and reduce the honing pressure and also to change to low speed reciprocation thereby to polish the bore wall.

2. In a honing machine, the combination of, a support for holding a workpiece having a bore to be honed, a tool head mounted for reciprocation along a path parallel to the axis of said bore, a spindle journaled on and projecting from said head along said axis and carrying a radially expansible and contractible honing tool at its outer end, a first two-speed electric motor mounted on said head and connected to said spindle to rotate the latter, a second two-speed motor connected to said head to reciprocate the latter along said path, a reversible actuator mounted on said head and connected to said tool to expand and contract the latter at rapid and slow rates, control means for operating said actuator and said motors to expand said tool slowly within said bore and reciprocate said head at the higher rate while rotating said spindle at the slower rate thereby to rough hone the bore, a sizing device operable to indicate when said bore attains a predetermined size, and additional control means activated by said sizing device when said size is attained to initiate slow contraction of said tool, slower reciprocation of said head, and faster rotation of said tool, said additional control means including a load meter responsive to the current drawn by said electric motor and operable when the current falls to a preselected value to deenergize said actuator and terminate said slow contraction.

3. In a honing machine, the combination of, a support for holding a workpiece having a bore wall to be honed, a tool head mounted for reciprocation along a path parallel to the axis of said bore wall, a spindle journalled on and projecting from said head along said axis and carrying a radially expansible and contractible honing tool at its outer end, power operated mechanism including a first two-speed actuator for rotating said spindle, a second two-speed actuator for reciprocating said head, and a reversible actuator for expanding and contracting said tool, means for controlling said actuators to effect a rough honing cycle in which said first actuator rotates said spindle relatively slowly, said second actuator reciprocates said head relatively rapidly, and said reversible actuator expands said head gradually to maintain a relatively high rough honing pressure between said tool and the bore wall, a sizing device operable to feel a portion of said bore wall and indicate when the bore attains a predetermined size, and additional control means activated by said sizing device when said predetermined size is attained and operable to operate said reversible actuator in a direction to contract said tool until a reduced honing pressure is obtained, increase the speed of rotation of said spindle, and reduce the rate of reciprocation of said head thereby to polish the bore wall.

4. A honing machine as defined in claim 3 further including means responsive to said honing pressure as the latter is reduced and operable to terminate contraction of said tool when said honing pressure reaches a preselected value.

5. A honing machine as defined in claim 4 in which said first actuator is an electric motor and said pressure responsive means is a load meter responsive to the current drawn by said motor.

6. In a honing machine, the combination of, a support for holding a workpiece having a bore wall to be honed, a tool support, a spindle mounted on and projecting from said tool support along the axis of said bore wall and carrying a radially expansible and contractible honing tool at its outer end, means mounting said supports for relative reciprocation along said axis, means mounting said workpiece and said spindle for relative rotation about said axis, a first two-speed power actuator for relatively reciprocating said supports, a second two-speed power actuator for relatively rotating said workpiece and said spindle, a reversible power actuator for expanding and contracting said tool, means for controlling said actuators to effect simultaneous slow rotation, rapid reciprocation, and gradual tool expansion for rough honing said bore wall, a sizing device operable to feel a portion of the bore wall and indicate when the latter attains a predetermined size, and additional control means activated by said sizing device when said predetermined size is attained and operable when activated to control said actuators to reduce the honing pressure, increase the speed of rotation, and reduce the rate of reciprocation to polish said bore wall.

7. A machine as defined in claim 6 further including a timer activated by said sizing device upon attainment of said predetermined bore wall size and operable to terminate polishing after a selected time interval.

8. In a honing machine, the combination of, a support for holding a workpiece having a bore wall to be honed, a tool support, a spindle mounted on and projecting from said tool support along the axis of said bore wall and carrying a radially expansible and contractible honing tool at its outer end, means mounting said supports for relative reciprocation along said axis, means mounting said workpiece and said spindle for relative rotation about said axis, a first power actuator for relatively reciprocating said supports and having two speeds of operation, a second power actuator for relatively rotating said workpiece and said spindle, a reversible power actuator for expanding and contracting said tool, means for controlling said actuators to effect simultaneous rotation and reciprocation and gradual tool expansion for rough honing said bore, a sizing device operable to feel a portion of the bore wall and indicate when the latter attains a predetermined size, and additional control means activated by said sizing device when said predetermined size is attained and operable when activated to control said actuators to reduce both the honing pressure and the rate of reciprocation to polish said bore wall.

9. The combination defined in claim 8 in which said additional control means includes means for controlling said reversible actuator to first contract said tool away from said bore wall, and then expand said tool into engagement with said reduced honing pressure.

10. In a honing machine, the combination of, a tool head, a radially expansible and contractible hone journaled on said head and adapted to enlarge a work bore by rotation and reciprocation therein, expanding mechanism within said hone including an element movable back and forth to expand and contract the hone, a drive shaft journaled in said head, mechanism connecting said shaft to said element and operable to move said element back and forth upon rotation of said shaft alternately in opposite directions, reversible rapid traverse and feed motors mounted on said head, a first driving connection between said rapid traverse motor and said shaft, a second driving connection between said feed motor and said shaft whereby said motors rotate the shaft and expand and contract said hone at rapid traverse and feed rates, said first connection including a slip friction clutch capable of transmitting a limited amount of torque to said shaft, means for activating said rapid traverse motor to expand said hone rapidly into full engagement with said bore and causing slipping of said clutch, and means responsive to slipping of said clutch to deactivate said traverse motor, activate said feed motor in a direction to contract said hone and, after a selected time interval, reverse the feed motor and initiate slow expansion of the hone.

11. The combination defined in claim 10 in which said last mentioned means includes a proximity generator energized by turning of said shaft and deenergized in response to slipping of said clutch.

12. The combination defined in claim 10 in which said second connection includes a magnetically applied drive clutch that is deenergized when said rapid traverse motor is activated and is energized in response to deactivation of the traverse motor thereby to couple said feed motor to said shaft.

13. In a honing machine, the combination of, a hone adapted to enlarge a work bore by rotation and reciprocation therein, expanding mechanism including an element movable back and forth to expand and contract said hone within a work bore, a power actuator having a driving connection with said element and selectively operable to move the element at rapid and slow rates, means for controlling said actuator to initiate rapid expansion of the hone within a bore, said driving connection including a slip friction coupling between said actuator and said element capable of transmitting a limited expanding force to the element whereby said coupling slips when said hone engages the bore with a predetermined pressure, and means for sensing slipping of said coupling and thereupon controlling said actuator to contract said hone slowly away from the bore until a reduced pressure is obtained and then initiate slow expansion of the hone.

14. In a honing machine, the combination of, a hone adapted to enlarge a work bore by rotation and reciprocation therein, expanding mechanism including an element movable back and forth to expand and contract said hone within a work bore, a power actuator having a driving connection with said element and selectively operable to move the element at rapid and slow rates, means for controlling said actuator to initiate rapid expansion of the hone within a bore, said driving connection including a yieldable coupling between said actuator and said element capable of transmitting a limited expanding force to the element whereby said coupling yields when said hone engages the bore wall with a predetermined pressure, and means for sensing yielding of said coupling and thereupon controlling said actuator to contract said hone slowly away from the bore until a reduced pressure is obtained and then initiate slow expansion of the hone.

15. The combination defined in claim 14 in which said coupling comprises a magnetically actuated clutch variably energized to vary said expanding force.

16. The combination defined in claim 14 in which said connection includes a shaft rotated by said actuator through said coupling, and said sensing means includes both a proximity generator energized by turning of said shaft, and means responsive to deenergization of said generator to initiate slow contraction of said hone.

17. The combination defined in claim 16 further including a timer actuated when slow contraction begins and operable to terminate such contraction and initiate slow expansion upon expiration of a preselected time interval.

References Cited by the Examiner

UNITED STATES PATENTS

| 1,817,953 | 8/1931 | Stevens | 51—50 |
| 2,129,049 | 9/1938 | Doran | 90—21 |
| 2,167,758 | 8/1939 | Johnson et al. | 51—34.3 |
| 2,797,531 | 7/1957 | Seborg | 51—165.01 XR |
| 2,971,623 | 2/1961 | Dirks | 192—142 |
| 3,087,281 | 4/1963 | Greening et al. | 51—34 |

ROBERT C. RIORDON, *Primary Examiner.*